United States Patent [19]

Kückens

[11] 4,378,079

[45] Mar. 29, 1983

[54] APPARATUS FOR ACCURATELY DOSING FLUIDS OF VARYING VISCOSITY

[75] Inventor: Alexander Kückens, Hamburg, Fed. Rep. of Germany

[73] Assignee: Dagma Deutsche Automaten-und Getrankemaschinen GmbH & Co., K.G., Fed. Rep. of Germany

[21] Appl. No.: 175,704

[22] Filed: Aug. 6, 1980

[30] Foreign Application Priority Data

Aug. 10, 1979 [DE] Fed. Rep. of Germany ....... 2932558

[51] Int. Cl.³ .............................................. B67D 5/00
[52] U.S. Cl. .................................. 222/333; 222/412; 222/504
[58] Field of Search ................ 222/333, 412, 413, 504

[56] References Cited

U.S. PATENT DOCUMENTS

| 2,325,441 | 7/1943 | Tucker et al. | 222/333 X |
| 3,258,166 | 6/1966 | Kückens | 222/479 X |
| 4,011,969 | 3/1977 | Martin | 222/504 X |

FOREIGN PATENT DOCUMENTS 448144 4/1948 Canada ................................. 222/333

*Primary Examiner*—Joseph J. Rolla
*Assistant Examiner*—Frederick R. Handren
*Attorney, Agent, or Firm*—Barnes, Kisselle, Raisch, Choate, Whittemore & Hulbert

[57] ABSTRACT

Apparatus for accurately dosing fluids of varying viscosity, especially highly viscous liquids, including a valve channel adapted to be vertically arranged and secured at one end to the inverted open end of a container for the liquid, a closure portion positioned within said valve channel including a ferrite core secured thereto, means for guiding the closure element vertically within the valve channel, a closure member secured to the bottom of the closure portion adapted to close the valve channel due to the weight of the closure element, a conveying element secured to the closure element for rotation therewith and an electromagnetic device surrounding the closure portion for simultaneously producing vertical and rotational movement of the closure portion and at least rotation of the conveying element whereby on energizing the magnetic device the closure portion is raised to open the valve channel to allow fluid flow through the valve channel and the closure portion is rotated along with the conveying element to aid in movement of the fluid through the valve channel.

10 Claims, 1 Drawing Figure

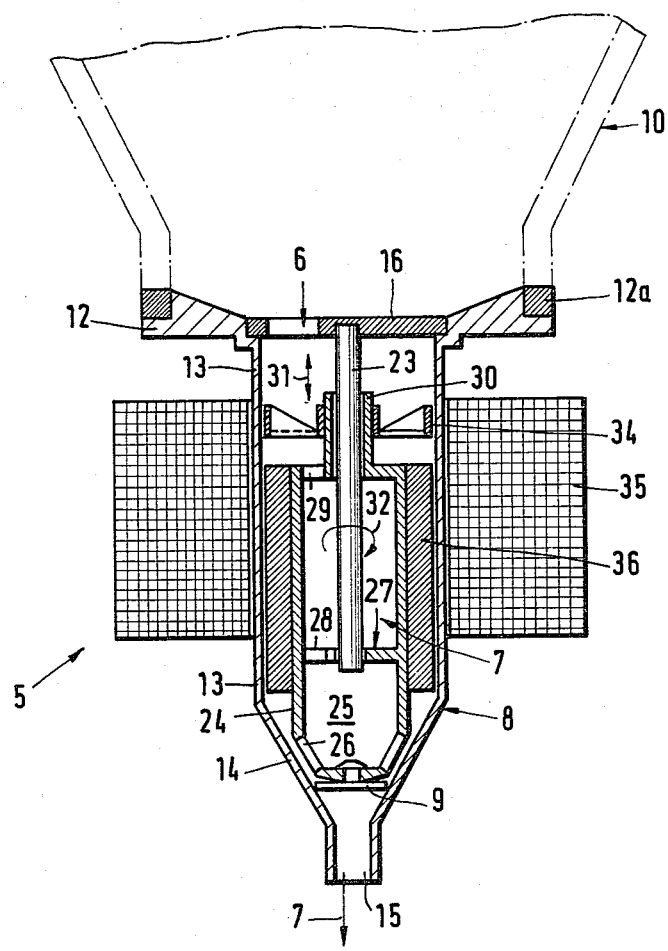

APPARATUS FOR ACCURATELY DOSING FLUIDS OF VARYING VISCOSITY

BACKGROUND OF THE INVENTION

The invention relates to an apparatus for accurately dosing fluids of varying viscosity, especially highly viscous liquids, such as syrups having a high sugar content, comprising a substantially vertically arranged valve channel connectible to a storage container or the like, wherein for closing and opening a valve outlet there is provided a closure portion magnetically liftable against gravity, said valve channel being surrounded by an electromagnetic device for generating the magnetic force.

2. Description of the Prior Art

Measures by means of which the outflow quantity of a fluid can be timed are known. To this end provision is made that the static pressure determining the outflow quantity is maintained constant independently of the respective level of the liquid contained for instance in a storage container (see U.S. Pat. No. 3,258,166). This involves the disadvantage that said measures are effective only provided the fluid always retains the same viscosity and the same flowability independently of time and ambient temperature. However, if by temperature influences or the like the viscosity varies, though the delivery time and the pressure decisive for the outflow quantity remain constant, the amount of fluid discharged within the same time is subjected to changes. Hence, an accurate dosing is possible only on the condition that the device operating according to this principle is provided with a means for preventing changes both as regards temperature and viscosity.

For this reason, it has been known in connection with highly viscous liquids, for instance syrups having a high sugar content, to dose by volume. This permits dosing independently of the viscosity and the variations thereof at almost constant rates. But this system suffers from the disadvantage that no flowing adjustment is possible and that volumetric dosing is subjected to changes as a function of the ambient temperature in so far as the velocity of outflow of the fluid from the volumetric dosing chamber is never constant. To this must be added that, due to the great changes in viscosity, the marginal adhesion of the fluid in the volumetric measuring chamber varies to a large extent. This is likely to result in inaccuracies as to dosing. This applies especially to those cases in which the surface subjected to marginal adhesion is generally large as compared to that of the amount to be dosed. Besides, in such a case it is not possible, either, to completely eliminate the difficulties arising from varying viscosity due to great changes in ambient temperature.

It is the problem of the present invention to remove these difficulties and to provide a simple apparatus for accurately dosing fluids of varying viscosity, which is free from the mentioned disadvantages and particularly suited for accurately dosing small quantities, especially of highly viscous liquids. The device is particularly suited for dosing syrups having a high sugar content.

SUMMARY OF THE INVENTION

According to the present invention, this problem is solved in that there is provided a rotor having a ferrite core and being drivable at a predetermined speed by a magnetic field, and which is drivingly connected with a conveying element, such as a conveyor worm, conveying wings or blades or the like. It is of advantage that both, the drive of the rotor and lifting of the closure portion can be achieved by one and the same magnetic field. The arrangement is especially simple and reliable, when the ferrite core as such is both liftable and drivable in rotary direction by the magnetic field and movably connected both with the closure portion and the rotor. The rotor need not participate in the axial movements of the ferrite core, whilst the closure portion proper need not participate in the rotary movement of the ferrite core. But, preferably, the conveying element and the closure portion form a movable unit which, together with the ferrite core, executes both the axial movement and the rotary movement. The weight of the total axially movable unit is utilized as closing pressure for the closure element to hermetically block the outlet of the valve channel.

The liftable and/or rotatably drivable unit is expediently centered on a fixed axis within the valve channel.

When the field coil of the electromagnetic device is in on position, a rotating magnetic field is built up. The ferrite core, which in its resting position that coincides with the closing position of the closure portion is located below the plane of the most efficient magnetic field effect, is lifted by the developing magnetic field into optimum position and driven in rotary direction, the speed being period controlled. Depending on the number of poles of the rotor, a larger or smaller drive torque is obtained. A four-pole or six-pole construction proved to be satisfactory.

Lifting of the closure element is performed by few millimeters only, which are sufficient to expose the outlet from the valve channel to the necessary extent. The speed of the rotor depends on the design of the rotor wings and on the desired conveying effect. There may for instance be envisaged a speed of 1500 revolutions per minute. The initial torque of the motor so formed is selected to be of sufficient strength to keep the starting phase at a very low level so that, despite a high viscosity of the fluid, the rotor runs at constant speed almost during the entire operating time. The gap between the rotor and the inner surface of the valve channel need not be exceedingly narrow, since the quantity of flow through the circumferential gap is negligible when the viscosity is high. In addition, it is to be considered that the relative rotary movement between the opposite surfaces impedes an axial flow through the gap.

The device may be combined with measures as known from initially cited U.S. Pat. No. 3,258,166 in order to maintain constant the static pressure acting on the fluid within the valve means.

It proved to be particularly advantageous to design the ferrite core as a hollow cylinder so that the fluid conveyed by the rotor flows off through the interior of the ferrite core.

Since sintered ferrite cores can be equated with ceramic bodies as regards high chemical resistance, it can as a rule be reckoned that they have sufficient resistance to corrosion by any of the fluids to be considered for employment. In exceptional cases the ferrite core or the rotor may be completely encased with a material indifferent with respect to the fluid.

The invention is hereinafter explained in conjunction with a diagrammatic drawing.

BRIEF DESCRIPTION OF THE DRAWINGS

The drawing shows an apparatus according to the present invention in vertical section.

DESCRIPTION OF THE PREFERRED EMBODIMENTS

The new dosing device 5 can be connected to an adequate container, for instance a transport or storage container 10, by means of a flange or cover 12, with a packing 12a being interconnected. The fluid within the container 10 is permitted to flow into the dosing means 5 through an inlet opening 6 in the depicted overhead position of the container 10 and flows out of the same at the lower end according to arrow 7.

The dosing apparatus comprises a valve housing 8, within which a closure element 7 can be moved up and down as indicated by the double arrow 31. At its lower end the closure element 7 is provided with a closure member 9 which sealingly cooperates with the inner surface of the lower conically tapered end 14 of the valve housing 8 in the lowered position of the closure element 7. The closure member 9 may consist of a separate elastic body, for instance an elastic disk, which by the weight of the closure element 7 in closing position is sealingly placed against the inner surface of portion 14 and at the same time is subjected to deformation. Below the closure member 9 there is provided an outlet opening 15 of the dosing apparatus in the form of a nozzle.

In the depicted example the valve housing 8 is integrally connected with its upper end to the disk-like connecting flange 12 of the dosing apparatus. The housing comprises a hollow cylindrical portion 13 defining a cylindrical valve channel within which the closure element 7 is arranged. Into the connecting flange 12 there is inserted a spider or a disk 16 containing the inlet opening(s) 6 for the fluid and supporting the upper end of a fixedly arranged guide rod 23 freely extending in downward direction and concentrically with respect to the cylindrical portion 13 of the valve housing 8. On said fixedly arranged guide rod 23 the closure element 7 is guided. In the depicted example the closure member consists of a hollow cylindrical body 24 of which the lower end is conically tapered and has outlet openings 26 and a lower end to which the closure member 9 is secured. Adjacent the upper end a sleeve-like portion 30 sliding on the guide rod 23 is arranged so as to leave free one or a plurality of inlet openings 29. For further guidage a central bore in a partition wall 27 is provided, which in turn contains one or a plurality of flow passages 28.

The diameter of the member 24 is markedly smaller than the inside width of the valve channel 13. In the annular space between the two members a sleeve-like ferrite core 36 is arranged, which is fixedly secured to the outer surface of the member 24 and leaves free a small annular gap opposite the valve channel wall 13, said annular gap permitting free movement of the closure element 7 both in axial direction and in rotational direction about the guide rod 23, as shown by the arrow 32, without an appreciable amount of the highly viscous fluid being able to pass through said gap.

In the FIGURE the ferrite core 36 is shown in a position lowered with respect to the magnetic plane of an electromagnetic coil 35, in which the closure element 7 with the closure member 9 seals the outlet opening 15 of the dosing apparatus. By an adequate pole formation the ferrite core forms a rotor which, together with the coil 35, acts as an electromotor whose speed is period-dependent. When the coil 35 is energized, a rotary field is built up having its maximum power approximately in a horizontal plane at half the level of the coil 35. By virtue of this magnetic field, the ferrite core 36 is raised from its lowered position shown in the FIGURE into a position in alignment with the coil 35, so that the closure member 9 releases the outlet opening 15. At the same time, the rotary field of the coil 35 covers the ferrite core, accelerating the same in an adequately designed system almost without an appreciable starting phase to a predetermined speed, which is practically constant during the turn-on period of the coil 35.

The ferrite core 36 connected to the member 24 and via the sleeve 30, is in rotating connection with a conveyor element 34 arranged above the ferrite core. The arrangement may be such that the conveyor element 34, independently of the closure element 7 and the ferrite core 36, is mounted rotatably but axially immovably and that the conveyor element and the ferrite core are fixedly connected as regards their rotational relation only. Preferably, however, the conveyor element 34 is tightly connected to the ferrite core or the portion 24 of the closure element, respectively. The ferrite core, the portion 24 and the conveyor element 34 form thus a unit which can be moved both in axial direction according to the arrow 31 and in rotary direction according to the arrow 32. The conveyor element 34 may be a conveyor worm portion, a conveying wing, a conveying shovel or the like. It may also be a one-winged or multi-winged rotary propeller.

Though it is possible to employ the ferrite core 36 for the rotary drive only, there is yet preferred the embodiment as shown in the drawing, wherein by the ferrite core also the closure element 7 is lifted from the closing position, so that one and the same coil 35 is responsible for carrying into effect opening and closing of the valve channel and at the same time for forcibly conveying the fluid through the open valve channel. Due to the construction of the conveying element and to the speed, the desired quantity of fluid is measured reliably as a function of viscosity during the opening time of the valve channel according to arrow 7 and discharged therefrom. The arrangement operates reliably and accurately, independently of temperature and variations in viscosity and without interference by the factors initially referred to in connection with the explanation of the level of prior knowledge. The volume control is easily adjustable by the construction of the conveying element and the rotor speed, it being possible for the conveying element 34 to be easily exchangeably connected with the ferrite core and the closure portion, respectively.

It is also possible to furnish the interior of the member 24 or the ferrite core 36 with conveying elements in addition to or instead of the conveying element 34 through which the fluid may flow.

I claim:

1. An apparatus for accurately dosing fluids of varying viscosity, especially highly viscous liquids, such as syrups having a high sugar content, comprising a substantially vertically arranged valve channel connectible to a storage container or the like, wherein for closing and opening a valve outlet there is provided a closure portion liftable against gravity by a magnetic force, said valve channel being surrounded by an electromagnetic device generating the magnetic force, characterized in that the closure portion is provided with a rotor having a ferrite core drivable by the magnetic force at a predetermined rotational speed, and a conveying element for conveying the fluids axially through the valve channel drivably connected to said rotor.

2. An apparatus as claimed in claim 1, characterized in that the conveying element is connected to the closure portion in fixed rotational relation.

3. An apparatus as claimed in claim 2, characterized in that the conveying element and the closure portion are integrally secured together for movement together.

4. An apparatus as claimed in claim 1, characterized in that the closure portion can be axially lifted as well as driven in rotary direction by means of the electromagnetic device via the ferrite core.

5. An apparatus as claimed in claim 4, characterized in that the closure portion as such is made from a ceramic ferrite and is designed in the form of a rotor without windings for use in a motor consisting of the closure portion and the electromagnetic device.

6. An apparatus as claimed in claim 1, characterized in that the conveying element is in the form of a rotary propeller which in contact-free relation occupies practically the inside width of the valve channel.

7. An apparatus as claimed in claim 5, characterized in that the ferrite core is annular and hollow cylindrical in shape and surrounds a flow passage through the closure portion.

8. An apparatus as claimed in claim 1, characterized in that the ferrite core is covered polydirectionally by a material indifferent relative to the fluid.

9. An apparatus as claimed in claim 6, characterized in that the ferrite core is annular and hollow cylindrical in shape and surrounds a flow passage through the closure portion.

10. An apparatus for accurately dosing fluids of varying viscosity, comprising a cylindrical valve channel means at one end of the valve channel for connecting the valve channel to a storage container for viscous liquids, a closure portion positioned within the valve channel including a hollow cylindrical portion, means extending axially of the valve channel for guiding the closure portion axially of the valve channel, a ferrite core secured to the cylindrical closure portion and extending into closely spaced relation with the inner walls of the valve channel, a closure member secured to one end of the closure portion for closing the valve channel with the closure portion in one limiting position thereof, a conveying element secured to the closure portion for at least rotational movement therewith and a magnetic device surrounding said valve channel for producing axial movement of the closure portion and rotational movement of both the closure portion and conveying element.

* * * * *